W. T. SMITH & C. C. ROYER.
TIRE.
APPLICATION FILED MAR. 19, 1909.
1,061,204.
Patented May 6, 1913.
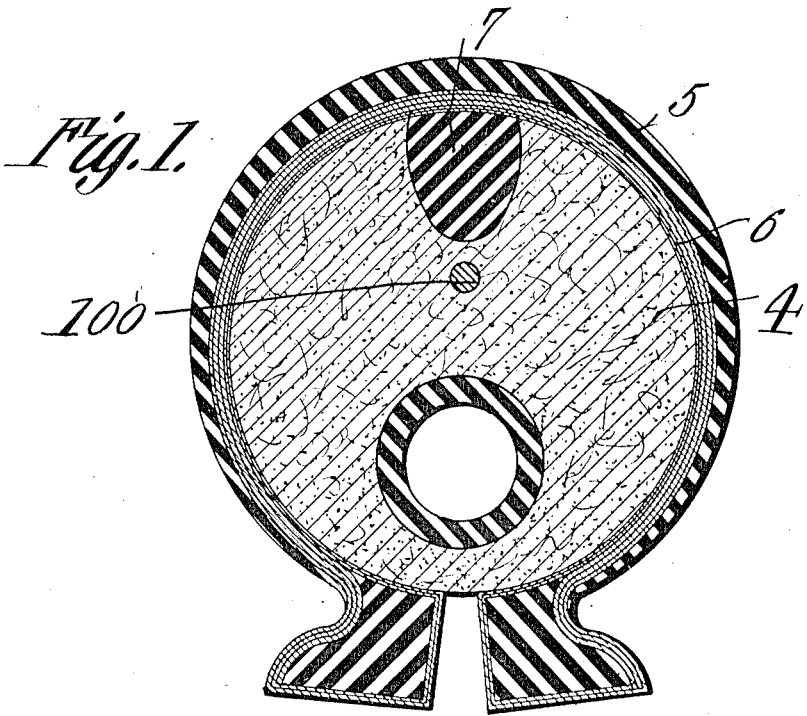
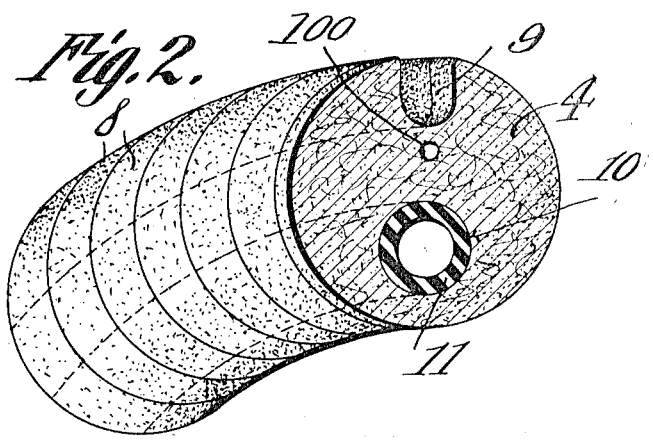
Witnesses
Inventors
William T. Smith
Charles C. Royer
By C. A. Snow & Co.
Attorneys

UNITED STATES PATENT OFFICE.

WILLIAM T. SMITH AND CHARLES C. ROYER, OF BELLEFONTAINE, OHIO; SAID ROYER ASSIGNOR TO MYRTLE SMITH, OF BELLEFONTAINE, OHIO.

TIRE.

1,061,204.

Specification of Letters Patent.

Patented May 6, 1913.

Application filed March 19, 1909. Serial No. 484,503.

*To all whom it may concern:*

Be it known that we, WILLIAM T. SMITH and CHARLES C. ROYER, citizens of the United States, residing at Bellefontaine, in the county of Logan and State of Ohio, have invented a new and useful Tire, of which the following is a specification.

It is the object of the present invention to provide a core for the outer tube of automobile and similar vehicle tires which will effectually replace the pneumatic inner tubes at present in use, and the invention aims incidentally, to provide a core of such character than the tire as a whole will have the same elastic and yieldable properties as the ordinary pneumatic tire but at the same time will not be liable to puncture or to other similar accidents such as a "blow-out" and the like.

In carrying out the invention, a fibrillous filling is provided for disposal within an ordinary outer tube of the clencher type and this filling has embedded therein or surrounds a pneumatic tube located directly inwardly radially with respect to the outer tube and adjacent the open side of the latter so that the stem of the pneumatic tube may project through the rim as usual. The pneumatic tube above mentioned is of such dimensions as to afford a support, so to speak, for the fibrillous filling although at the same time it is compressible to a certain degree so as not to render the core so rigid as to be undesirable for use; and the location and arrangement of the tube with respect to the rib which is formed upon the outer tube interiorly thereof, insures ease in the insertion of the core and its compression by the outer tube in the act of assembling the parts.

Another feature of the invention resides in forming the fibrillous filling of greater diameter than the interior diameter of the outer tube when closed so that when the said outer tube is enveloped about the core, the core will be compressed to such degree as to render the tire firm but still not to such degree as will render it as solid as if made of a solid mass of rubber or other similar material.

In the accompanying drawings, Figure 1 is a transverse sectional view through a tire constructed in accordance with the invention. Fig. 2 is a perspective view of a portion of the filling showing one manner of forming the same.

In the drawings, there is shown an outer tube of the clencher type, indicated by the numeral 5 and having a bore 6 which is cylindrical except where it is interrupted by a radial rib 7 which extends circumferentially around the inner wall of the tire along the tread portion thereof, and this rib is shown as substantially conoidal in cross section although it will be understood that it may have any other form desired. The object of this rib is to reinforce the tire at its tread portion or more specifically speaking, to reinforce the outer tube of the tire at its said portion and further to cause compression of a core 4, which is provided within the said outer tube, in certain directions when pressure is exerted against the tread portion of the tire at any point. Broadly speaking, the core 4 for the outer tube is composed of fibrillous material such as felt or the like and it may be found desirable to build up the filling by assembling and securing together a number of disk-like segments of fibrillous material and such method of forming the filler is illustrated in Fig. 2 of the drawings. These disk-like segments are preferably formed by stamping or cutting, by the use of a suitable die, the properly shaped disks from a sheet of compressed fibrillous material such as a sheet of felt. The disk-like segments above mentioned are indicated, in the said Fig. 2 of the drawings, by the numeral 8 and each of these segments is cut with a notch 9 and at a point diametrically opposite the notch with an opening 10, the notches 9 registering when the disk segments are properly assembled so as to form, about the filler, an annular groove in which is received the rib 7 upon the inner surface of the outer tube 5 of the tire. It will be understood of course that in assembling these segments 8 to form the tire filler, any desired securing means may be employed for connecting them together in an annular series and for example such securing means may be in the nature of a suitable cement or thin wire 100 threaded through the segments or any other suitable means may be employed. In assembling the disk-like segments 8, moreover, they are assembled or arranged upon an inner pneumatic tube 11 which is inserted through the openings 10 and serves to hold or brace the filler, comprised of the segments 8, in proper form and to cushion the same as will presently be described.

It is to be noted that the walls of the notches 9 are parallel, whereas, the rib 7 is wedge-shaped. When the rib 7 enters the notches 9, the disks will be expanded at the tread of the tire, and forced together adjacent the inner circumference of the tire, whereby the disks will be made to grip the inclosed tube.

From the foregoing description of the invention, it will be seen that there is provided a tire having a core which possesses such properties as permit of its use in place of the ordinary pneumatic inner tube employed in connection with tires of this general class and it will further be understood that pressure exerted against the tread of the tire will force the rib 7 inwardly at the point at which the pressure is applied and in a direction radially toward the pneumatic tube, thereby compressing the fibrillous material between the rib and the tube to a greater degree than at any other point although this pressure exerted in a radial direction, will resolve itself into lateral lines of force whereby to compress the material at the sides of the core. As heretofore stated, the core is formed of a diameter greater than the diameter of the bore 6 of the outer tube of the tire so that when the core is inserted into the outer tube, force will be required to be exerted to close the open side of the outer tube around the core. This exertion of force, in clamping the tire upon the vehicle wheel, will result in the core being compressed to a slight degree, owing to the snug fit of the outer tube therearound, and consequently the outer tube will be completely filled although the core will not be compressed to such degree as to render it too solid for use. The location of the pneumatic tube along the inner edge of the core, adjacent the points where the flaps of the clencher tube 5 are to be drawn together, serves to assist in that operation if it be deflated and afterward inflated as usual.

What is claimed is:—

A tire consisting of a resilient outer tube, longitudinally split along its inner face, to separate its inner edges; a core within the tube, the core consisting of abutting disks embraced closely by the tube, the disks being provided with alined notches having parallel walls; a pneumatic tube threaded through the disks and located close to the fixed inner edges of the outer tube, the pneumatic tube being adapted to yield, and to prevent a forcing of the disks between the inner edges of the outer tube; the resilient outer tube being provided with an integrally formed wedge shaped rib, registering in the notches to expand the disks and to prevent movement between the disks and the outer tube; and a wire inserted through the disks between the rib and the pneumatic tube, whereby the rib and the wire will serve to reinforce the tire along its median plane and coöperate with the pneumatic tube in resisting a compression of the disks between the inner edges of the outer tube.

In testimony that we claim the foregoing as our own, we have hereto affixed our signatures in the presence of two witnesses.

WILLIAM T. SMITH.
CHARLES C. ROYER.

Witnesses:
MABEL BEANS,
HENRY C. HAYES.